(12) United States Patent
Frazier et al.

(10) Patent No.: US 11,416,329 B2
(45) Date of Patent: Aug. 16, 2022

(54) SYSTEM AND METHOD FOR COMMUNITY DRIVEN ERROR HANDLING SYSTEM FOR PLATFORM USERS

(71) Applicant: Dell Products, LP, Round Rock, TX (US)

(72) Inventors: Michael C. Frazier, Bryn Mawr, PA (US); Justin T. Petrone, West Chester, PA (US)

(73) Assignee: BOOMI, LP, Chesterbrook, PA (US)

( * ) Notice: Subject to any disclaimer, the term of this patent is extended or adjusted under 35 U.S.C. 154(b) by 63 days.

(21) Appl. No.: 16/440,488

(22) Filed: Jun. 13, 2019

(65) Prior Publication Data
US 2020/0394098 A1    Dec. 17, 2020

(51) Int. Cl.
*G06F 11/07* (2006.01)

(52) U.S. Cl.
CPC ...... *G06F 11/0793* (2013.01); *G06F 11/0709* (2013.01); *G06F 11/079* (2013.01); *G06F 11/0769* (2013.01)

(58) Field of Classification Search
CPC ............. G06F 11/0793; G06F 11/0709; G06F 11/0769; G06F 11/079
See application file for complete search history.

(56) References Cited

U.S. PATENT DOCUMENTS

| | | | | |
|---|---|---|---|---|
| 8,732,668 B2* | 5/2014 | Klemenz | ............ | G06F 11/0793 717/125 |
| 8,997,088 B2* | 3/2015 | Gurikar | ............... | G06F 8/61 717/173 |
| 9,069,665 B2* | 6/2015 | Murphy | ............... | G06F 11/0709 |
| 9,891,982 B2* | 2/2018 | Johnson | ................ | G06F 11/079 |
| 10,255,125 B2* | 4/2019 | Terashita | ............ | G06F 11/0769 |
| 10,558,514 B2* | 2/2020 | D | .......................... | G06F 11/0787 |
| 2004/0078667 A1* | 4/2004 | Salem | ................... | G06F 11/079 714/E11.026 |
| 2007/0124367 A1* | 5/2007 | Fan | ..................... | G06F 11/0742 709/203 |
| 2008/0163164 A1* | 7/2008 | Chowdhary | ............. | G06F 8/35 717/106 |
| 2008/0270977 A1* | 10/2008 | Nucci | .................. | G06F 3/0482 717/105 |

(Continued)

*Primary Examiner* — Jonathan D Gibson
(74) *Attorney, Agent, or Firm* — Prol Intellectual Property Law, PLLC; H. Kenneth Prol

(57) ABSTRACT

An error revision suggestion method for customized software integration applications may comprise storing a plurality of customized software integration applications for specific integration processes for transforming data to enable electronic data exchange, generated from a customized visual model with a plurality of visual modeling elements representing customized executable code sets. The method may further comprise transmitting an executable run-time engine for a first of the plurality of customized software integration applications and a first customized code set for execution at a specific user business process system, receiving an indication an error has occurred during execution of the first customized code set, and transmitting an instruction to the user indicating a correction to erroneous user input is required to resolve the error if the error is associated in a resolve database with a previously executed correction to erroneous user input.

20 Claims, 5 Drawing Sheets

(56) References Cited

U.S. PATENT DOCUMENTS

| | | | |
|---|---|---|---|
| 2011/0282715 A1* | 11/2011 | Nguyen | G06Q 10/06 |
| | | | 715/764 |
| 2012/0041945 A1* | 2/2012 | Blubaugh | G06F 16/25 |
| | | | 707/722 |
| 2013/0111277 A1* | 5/2013 | Klemenz | G06F 11/0793 |
| | | | 714/57 |
| 2015/0178141 A1* | 6/2015 | Terashita | G06F 11/0709 |
| | | | 714/57 |
| 2019/0138380 A1* | 5/2019 | D | G06F 11/0793 |
| 2019/0179664 A1* | 6/2019 | Gujarathi | H04L 63/00 |
| 2019/0227787 A1* | 7/2019 | Kumar | G06F 8/71 |
| 2020/0334135 A1* | 10/2020 | Bragdon | G06F 11/3636 |
| 2020/0334376 A1* | 10/2020 | Bragdon | G06F 21/6245 |
| 2020/0394098 A1* | 12/2020 | Frazier | G06F 11/0769 |

* cited by examiner

SYSTEM AND METHOD FOR COMMUNITY DRIVEN ERROR HANDLING SYSTEM FOR PLATFORM USERS

FIELD OF THE DISCLOSURE

The present disclosure relates generally to a system and method for deploying and executing customized data integration applications, and/or an information handling system operating an integration application management system to deploy and execute customized data integration processes. More specifically, the present disclosure relates to logging, tracking, and suggesting resolutions for errors detected during execution of customized data integration processes based on past performance of such suggested resolutions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
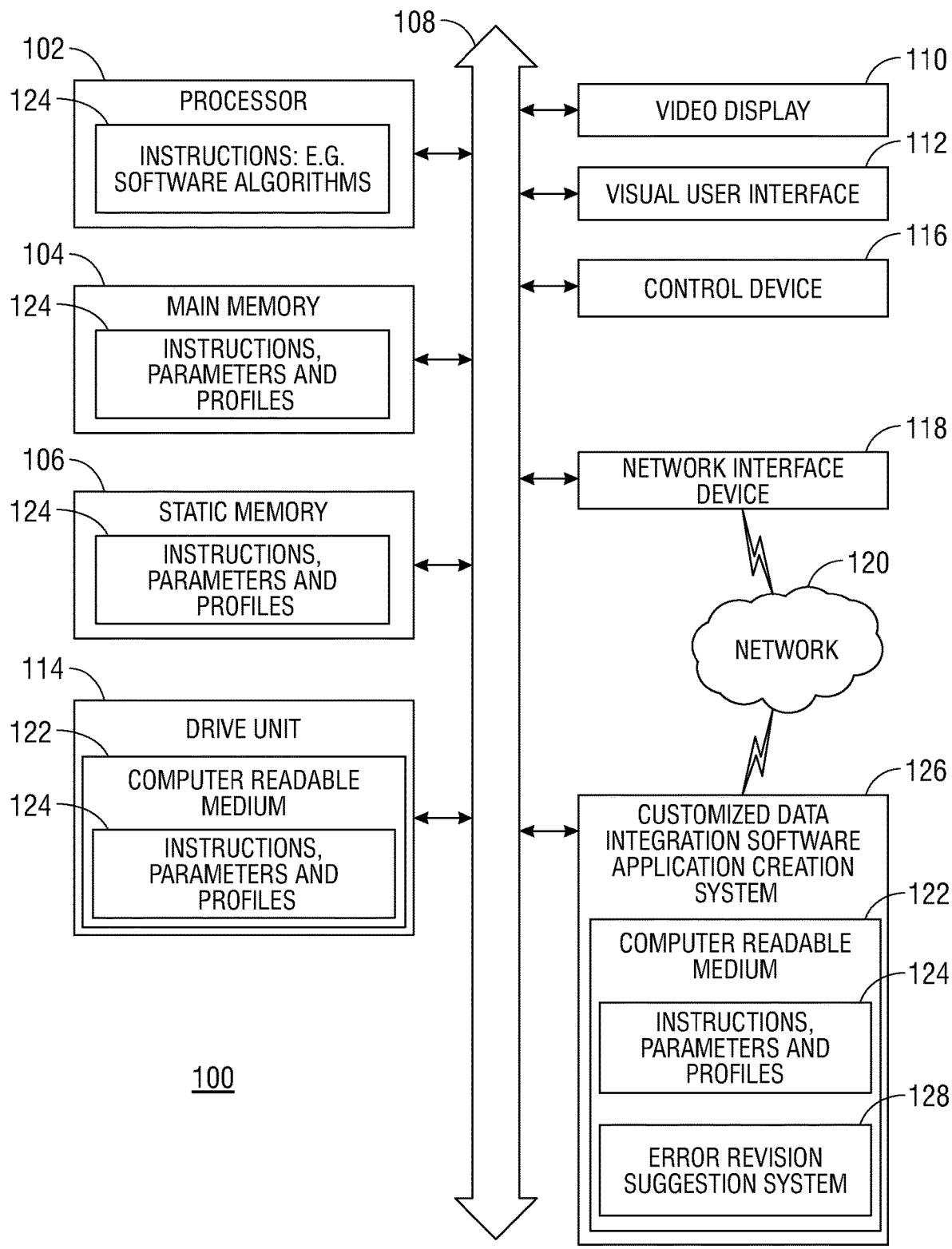
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution via download of the application from the worldwide web to an end user. Upon receipt of the downloaded application, the end user executes installation files to install the executable software application on the user's personal computer (PC), etc. When the software is initially executed on the user's PC, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's SAP purchase order processing system. There is also a significant need to communicate between different software applications/systems within different computing networks, e.g. between a buyer's purchase order processing system, and a seller's invoicing system.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today, licensed or purchased from software vendors and installed on a computerized system owned and maintained by the business, in this example the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc. physically located outside of an enterprises' physical boundaries). After the generic application is installed, it is then configured and customized for a specific trading partner, after which it is ready for execution to exchange data between the specific trading partner and the enterprise. For example, WalmartŁ may provide on its website specifications of how electronic data such as Purchase Orders and Invoices must be formatted for electronic data communication with WalmartŁ, and how that data should be communicated with WalmartŁ. A supplier/enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model an "integration process" via a flowcharting process, using only a web browser interface. During such a modeling process, the user would select from a predetermined set of process-representing visual elements that are stored on a remote server, such as the web server. By way of an example, the integration process could enable a bi-directional exchange of data between its internal applications, between its internal applications and its external trading partners, or between internal application and applications running external to the enterprise. Applications running external to the enterprise are commonly referred to as SaaS "Software as a Service."

A customized data integration software application creation system in an embodiment may allow a user to create a customized data integration software application by modeling a data integration process flow using a visual user interface. A user may model the process flow by adding visual elements representing integration process components which are associated with process component code sets incorporating machine-readable, executable code instructions for execution by a run-time engine. Each process component may be associated with an integration process action to be taken on incoming data. Each process component may further be associated with process component parameters detailing specific aspects of the process action to be taken. For example, a process component may instruct the run-time engine to take the action of querying a database, and the process component parameters may provide the name, location, user name, and required password for achieving the action of querying the database. Each process component parameter in an embodiment may be associated with a data profile code set.

If a process component having process component parameters specific to one of a user's known trading partners, the user may wish to reuse the same process component (which has already been tailored for use with a specific known trading partner) in other data integration process flows. In such a scenario, a user may save the process component already tailored for use with a specific known trading partner as a trading partner component, which the customized data integration software application creation system may associate with a trading partner code set.

With these software applications, an employee within an enterprise may use a specially configured graphical user interface to visually model an "integration process" via a flowcharting process, using only a web browser interface. In doing so, the user may combine one or more visual elements representing parts of an integration process into a visual flowchart shown on the visual user interface. The user may also affect these visual elements by adding user input within the visual user interface. Each visual element or process component represented within the integration process visual flowchart may be associated with a generic, pre-written set of code in the form of a document file (e.g., XML, or JSON) called a process component code set. The combination of each of these visual elements or process components into a single flow chart may be associated with an integration process executed by executing each of the process component code sets, based on the order in which they are modeled within the flow chart. The combination of each of the process component code sets may comprise an integration application template. The integration application templates may also include markers indicating where further code associated with the user input may be invoked from within the integration application template in order to customize it. Each user input variable may be associated with a data profile code set file, which may be invoked from within the integration application template at the marker location. The combination of the user-defined flow process (e.g., order of process components within the flow chart) and addition of user input variables within data profiles associated with those process components may operate to customize the integration process to the specific needs of a single user.

Errors in the flow chart modeling the integration process, in one or more process component code sets, or in one or more data profile code sets may result in failure to fully execute the customized integration process. User input errors caused by erroneous information entered by the user describing locations of data to be integrated, or permissions for accessing such locations may be relatively easy to identify upon closer inspection. One simple solution to such erroneously entered information is to move the data to the location erroneously entered, or to change the authentications or permissions required to access the data to the erroneous information. In contrast, revising or debugging the process component code sets or data profile code sets may involve a lengthy, time-consuming process, followed by repackaging and redeployment of the runtime engine and code sets. A system that may differentiate between these two scenarios based on the type of error causing the integration process failure is needed.

The error revision suggestion system in embodiments of the present disclosure may differentiate between these two types of problems based on the error code or error identifier received upon attempting execution of the integration process. In embodiments described herein, the service provider of the customized data integration software application may store a plurality of error identifiers associated with fixes or code revisions that have been known to resolve those errors in the past. The error revision suggestion system may access this resolve database when a new error identifier is transmitted to it, and determine whether that error identifier is associated in the resolve database with correction of user input errors, or with more time-consuming revisions to the process component code sets or data profile code sets. The error revision suggestion system can point the user toward resolutions not involving debugging, rather than revisions to the process component code sets or data profile code sets when the same error has been previously resolved by correction of user input errors, without resorting to such debugging of the code sets, or when revising the process component code sets or data profile code sets has proven unlikely to resolve the identified error. In such a way, the error revision suggestion system may deter the user from entering into an unnecessary and time-consuming code revision.

Because the process component code sets and portions of the data profile code sets in embodiments described herein may be used by different enterprises or customers of the service provider, errors associated with failed integration processes employing such shared process component code sets and data profile code sets may be common to a plurality of different enterprises, customers, or integration processes. As such, an error revision that successfully resolves an error encountered by one of the plurality of different enterprises, customers, or integration processes in an embodiment may similarly solve the same error encountered by another of the plurality of different entities or processes. In another aspect, attempted revisions that failed to correct such a problem may be less likely to resolve a similar error experienced by another user or process. A process is needed to leverage the similarity of errors likely encountered across a spectrum of enterprises, customers, or integration processes in order to suggest the revision most likely to successfully resolve each error.

Embodiments of the present disclosure address this issue by suggesting revisions based on confidence scores describing the likelihood such a revision will successfully resolve a given error. Each error identifier in an embodiment may be associated with one or more potential methods for resolution. Some of these methods may have been previously executed by the same or other users, and may or may not be associated with a confidence rating indicating the past success rate of the previous method in resolving the identified error. The error revision suggestion system in embodiments of the present disclosure may access the resolve database to identify a previously executed code revision or other fix known to have successfully resolved a given error in a previously executed integration process, either for the same enterprise system/customer/integration process or another enterprise system/customer/integration process. The error revision suggestion system may then transmit a user instruction to user to execute the previously executed code revision or other fix in order to resolve the error generated in response to the current failed integration process execution. The error revision suggestion system in embodiments of the present disclosure may also update or generate a confidence score associated with the error identifier and suggested error revision or fix to reflect the success or failure of the suggested revision or fix within the resolve database. In such a way, the error revision suggestion system may track success rates of potential error resolutions over a plurality of users and integration processes in order to more efficiently guide the user through the error resolution process.

Examples are set forth below with respect to particular aspects of an information handling system for associating user given voice commands with integration processes or user input required to execute integration processes to create a customized data integration software application.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the error revision suggestion system 128 or the customized data integration software application creation system 126 that may operate on servers or systems, remote data centers, or on-box in individual client information handling systems such as a local display device, or a remote display device, according to various embodiments herein. In some embodiments, it is understood any or all portions of code 124 for the error revision suggestion system 128 or the customized data integration software application creation system 126 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the error revision suggestion system 128 or the customized data integration software application creation system 126 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the error revision suggestion system 128 or the customized data integration software application creation system 126. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment permitting a user to define process flows between applications/systems, such as between trading partner and enterprise systems, and to model a customized business integration process. The visual user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface 112 are stored in a memory of the error revision suggestion system 128 or the customized data integration software application creation system 126.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. The providing of this input by the user results in the system's receipt of such user-provided information as an integration process data profile code set.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), or APIs generated using open source technology such as SwaggerŁ, OpenAPI GeneratorŁ, ReDocŁ, LucyBot DocGenŁ, API TransformerŁ, DapperDoxŁ, WiddershinsŁ, and API SpecConverterŁ may enable application programs 124 to interact or integrate operations with one another. For example, an API located remotely from the information handling system 100 in some embodiments may operate to transmit and receive notifications and instructions between the remote location and the error revision suggestion system.

In an example of the present disclosure, instructions 124 may execute software for generating a visual connector element for an integration process involving data transfer or manipulation between an enterprise system/network and an API, and an API may enable interaction between the application program and device drivers and other aspects of the information handling system and software instructions 124 thereon. The computer system 100 may operate as a stand-alone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the error revision suggestion system 128 or the customized data integration software application creation system 126 may include a computer-readable medium 122 such as a magnetic disk, or a solid-state disk in an example embodiment. The computer-readable medium of the memory 104, storage devices 106 and 114, and the error revision suggestion system 128 or the customized data integration software application creation system 126 may store one or more sets of instructions 124, such as software code corresponding to the present disclosure.

The disk drive unit 114, static memory 106, and computer readable medium 122 of the error revision suggestion system 128 or the customized data integration software application creation system 126 also contain space for data storage such as an information handling system for managing locations of executions of customized integration processes in endpoint storage locations. Connector code sets, and trading partner code sets may also be stored in part in the disk drive unit 114, static memory 106, or computer readable medium 122 of the error revision suggestion system 128 or the customized data integration software application creation system 126 in an embodiment. In other embodiments, data profile code sets, and run-time engines may also be stored in part or in full in the disk drive unit 114, static memory 106, or computer readable medium 122 of the error revision suggestion system 128 or the customized data integration software application creation system 126. Further, the instructions 124 of the error revision suggestion system 128 or the customized data integration software application creation system 126 may embody one or more of the methods or logic as described herein.

In a particular embodiment, the instructions, parameters, and profiles 124, and error revision suggestion system 128 or the customized data integration software application creation system 126 may reside completely, or at least partially, within the main memory 104, the static memory 106, disk drive 114, and/or within the processor 102 during execution by the information handling system 100. Software applications may be stored in static memory 106, disk drive 114, and the error revision suggestion system 128 or the customized data integration software application creation system 126.

The network interface device 118 can provide connectivity to a network 120, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 118 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 118 may operate two or more wireless links. The wireless network may have a wireless mesh architecture in accordance with mesh networks described by the wireless data communications standards or similar standards in some embodiments but not necessarily in all embodiments.

The error revision suggestion system 128 or the customized data integration software application creation system 126 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the error revision suggestion system 128 and the customized data integration software application creation system 126. The error revision suggestion system 128 and the customized data integration software application creation system 126 may be operably connected to the bus 108. The error revision suggestion system 128 and the customized data integration software application creation system 126 are discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the error revision suggestion system 128 or the customized data integration software application creation system 126 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
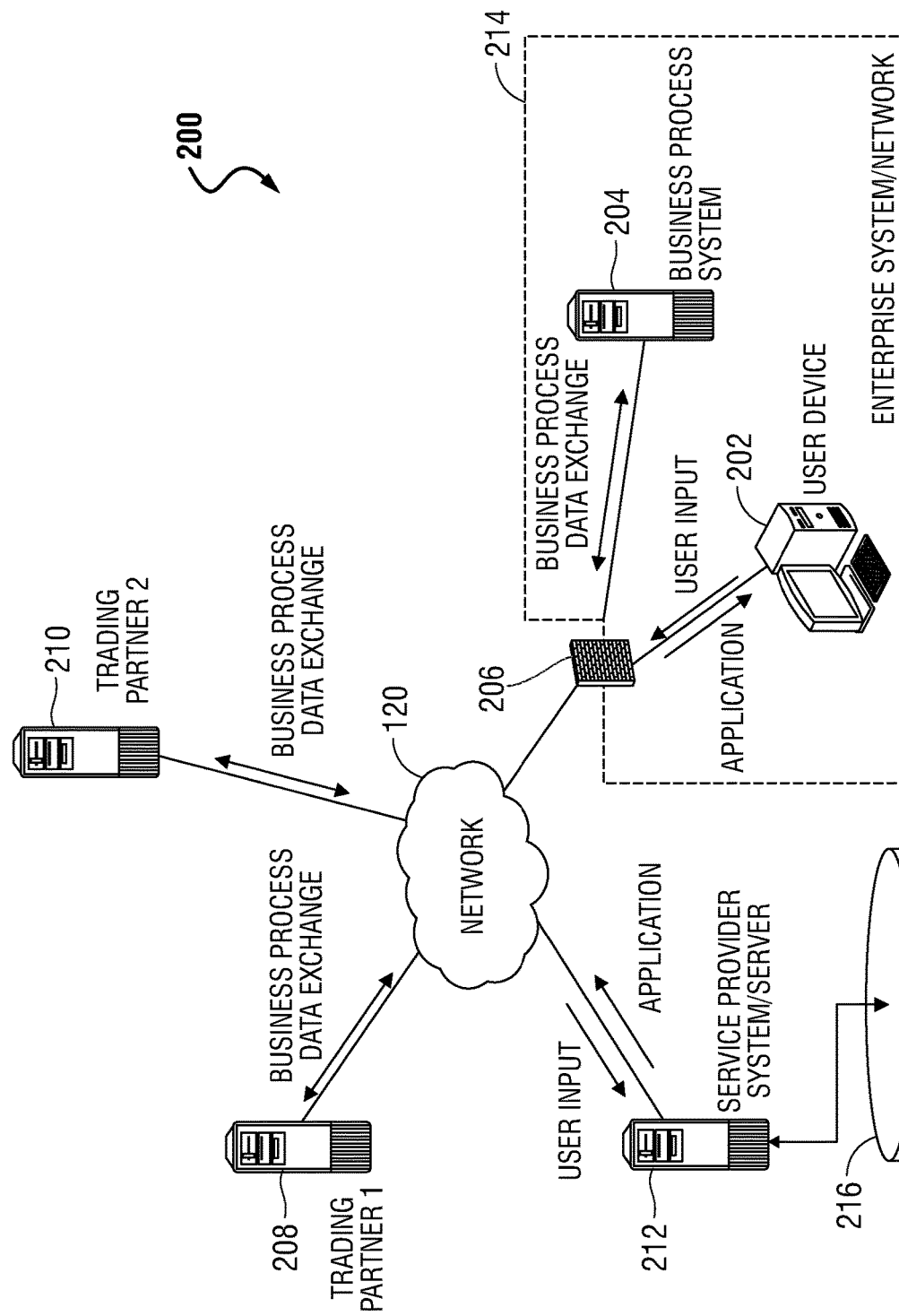
FIG. 2 is a block diagram illustrating a simplified integration network in an embodiment according to the present disclosure.

FIG. 2 is a block diagram illustrating a simplified integration network in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In another embodiment, the user device 202 may include an API for transmitting and receiving notifications and instructions between the user device 202 and an error revision suggestion system operating at a service provider server/system 212.

In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks£, Salesforce£ SAP's SAP ERP£, Oracle's Open World£ and ERP cloud£, Infor's WMS Application£ or other ERP applications, or many other types of databases.

In an embodiment, the integration network 200 may further include conventional hardware and software providing trading partners 208 and 210 for receiving and/or transmitting data relating to business-to-business transactions. It is contemplated such systems are conventional and well-known. For example, Walmart£, may operate trading partner system 208 to allow for issuance of purchase orders to suppliers, such as the enterprise 214, and to receive invoices from suppliers, such as the enterprise 214, in electronic data form as part of electronic data exchange processes of a type well known, including, but not limited to via the world wide web, and via FTP or SFTP.

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214 and other similar enterprise networks (not shown). The service provider system/server 212 in an embodiment may be specially configured to store certain pre-defined, i.e. pre-built, datasets in its memory. Such data may include a pre-defined container (also referred to herein as a "dynamic runtime engine") installation program that is executable at the enterprise system 214 or other enterprise systems, or at a third party server (not shown) located remotely from both the service provider system/server 212 and the enterprise system 214.

The runtime engine may operate to download machine-readable, executable code instructions from the service provider server/system 212 in the form of code sets, which may include pre-built software code stored on the service provider system/server 212 such as process component code sets, trading partner code sets, and/or data profile code sets. The runtime engine may further operate to execute those code sets in order to perform an integration process, providing for exchange of business integration data between the enterprise's business process system 204 and user device 202 within the enterprise network 204, and/or between the enterprise network 214 and trading partners 208 and 210, and/or between the enterprise's internal computing system 204 and the enterprise's computing systems external to the enterprise network 214, commonly referred to as SaaS (Software as a Service). For example, the application template in an embodiment may be constructed as an integration of customer data between Salesforce.com and SAP using java programming technology. In other embodiments, other runtime engines may operate to execute those code sets in order to perform an integration process, providing for exchange of business integration data between another enterprise network (not shown) and trading partners 208 and 210, and/or between internal systems of the other enterprise network (not shown). Thus, the code sets from the service provider server/system 212 may be used by multiple enterprise networks, and combined with other code sets and data specific to each individual enterprise network to generate integration process applications customized for each enterprise network individually.

A process component code set in an embodiment may correspond to a modeled integration process component, but may not itself be configured for use with any particular enterprise, or any particular trading partner. Accordingly, the process component code set may not yet be ready for execution to provide business integration functionality for any particular trading partner or enterprise until the process component code set is configured to be executable with additional code and/or data in the form of one or more integration data profile code sets incorporating user-specific information or trading partner specific information. Thus, the process component code set in an embodiment may be used by different enterprises or customers of the service provider 212. By configuring a process component code set to be executable with a data profile code set incorporating trading partner specific information, a user may instruct the creation of a trading partner code set.

The dynamic runtime engine may download to its location pre-built process component code sets, trading partner code sets, and/or data profile code sets from the service provider system/server 212, and execute the pre-built process component code sets, trading partner code sets, and/or data profile code sets according to a visual flowchart residing at the service provider server/system 212 and modeled by the user using a provided visual graphical user interface and/or using voice commands.

The service provider server/system 212 in an embodiment may also include or communicate with a resolve database 216 operating to track success rates of error revisions across a plurality of users and integration processes. Because the process component code set in an embodiment may be used by different enterprises or customers of the service provider 212, errors associated with failed integration processes employing such shared process component code sets may be common to a plurality of different enterprises or customers. As such, an error revision that successfully resolves an error encountered by one of the plurality of different enterprises or customers in an embodiment may similarly solve the same error encountered by another of the plurality of different enterprises. In another aspect, attempted revisions that failed to correct such a problem may be less likely to resolve a similar error experienced by another user.

The resolve database 216 in an embodiment may operate to store associations between error identifiers (e.g., error codes generated following failed integration process executions at the user device 202) and methods attempted to resolve those identified errors. Each error identifier in an embodiment may be associated with one or more potential methods for resolution. Some of these methods may have been previously executed by the same or other users, and may or may not be associated with a confidence rating indicating the past success rate of the previous method in resolving the identified error. In some embodiments, the methods associated with the error identifier may require the user to revise or debug the code sets deployed to the enterprise system/network 214 and executed by the runtime engine. Such code revisions in an embodiment may occur at the service provider system/server 212, which may then re-deploy the revised code sets and runtime engine for execution at the enterprise system/network 214. In other embodiments, the methods associated with the error identifier may point the user toward revisions that do not require any such code revisions occurring at the service provider system/server 212.

The service provider system/server 212 may further include an error revision suggestion system operating to access the resolve database 216 and suggest potential fixes or revisions to users encountering errors in execution of deployed integration processes. For example, a runtime engine in an embodiment may generate an error identifier upon failed execution of a deployed integration process, and the runtime engine or an API for the error revision suggestion system operating at the user device 202 or the business process system 204 may transmit that error identifier to the error revision suggestion system at the service provider system/server 212 via network 120. The error revision suggestion system operating at the service provider server/system 212 in such an embodiment may access the resolve database 216 to identify a previously executed code revision or other fix known to have successfully resolved the same error in a previously executed integration process, either for the same enterprise system/network 214 or another enterprise system/network (not shown). The error revision suggestion system operating at the service provider server/system 212 may then transmit a user instruction to the API or runtime engine at the enterprise system/network 214 to execute the previously executed code revision or other fix in order to resolve the error generated in response to the current failed integration process execution.

The API or runtime engine at the enterprise system/network 214 in such an embodiment may also operate to notify the error revision suggestion system operating at the service provider server/system 212 whether the suggested error revision or fix successfully resolved the error generated in response to the current failed integration process execution. The error revision suggestion system operating at the service provider server/system 212 in such an embodiment may update or generate a confidence score associated with the error identifier and suggested error revision or fix to reflect the success or failure of the suggested revision or fix within the resolve database 216. In such a way, the error revision suggestion system may track success rates of potential error resolutions over a plurality of users and integration processes in order to more efficiently guide the user through the error resolution process.

Figure 3:
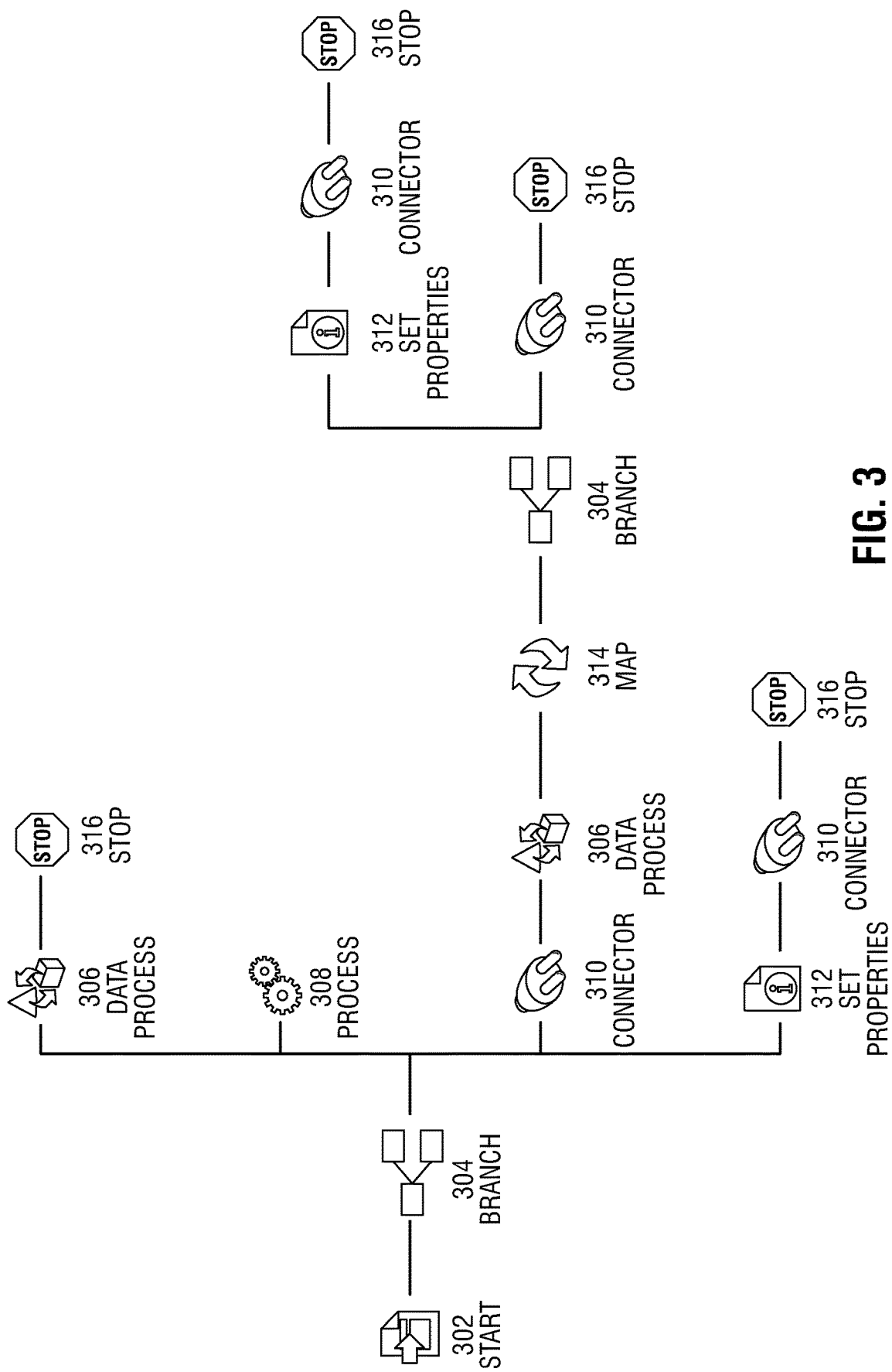
FIG. 3 is a block diagram illustrating a user-generated flow diagram of an integration process according to an embodiment of the present disclosure.

FIG. 3 is a block diagram illustrating a user-generated flow diagram of an integration process according to an embodiment of the present disclosure. A user may generate a flow diagram in an embodiment by providing a chronology of process-representing visual elements via the use of a visual user interface. As discussed above, the visual user interface in an embodiment may provide a visual designer environment permitting a user to define process flows between applications/systems, such as between trading partner and enterprise systems, and to model a customized business integration process. The visual user interface in an embodiment may provide a menu of pre-defined user-selectable visual elements and permit the user to arrange them as appropriate to model a process. The elements may include visual, drag-and-drop icons representing specific units of work (known as process components) required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the customized data integration software application creation system in the form of process component code sets, trading partner code sets, and/or data profile code sets.

Each process component may be identifiable by a process component type, and may further include an action to be taken. For example, a process component may be identified as a "connector" component. Each "connector" component, when chosen and added to the process flow in the visual user interface, may provide a drop down menu of different actions the "connector" component may be capable of taking on the data as it enters that process step. The action the user chooses from the drop down menu may be associated with a process component action value, which also may be associated with a process component code set. Further, the graphical user interface in an embodiment may allow the user to define the parameters of process components by providing user input, which the customized data integration software application creation system may correlate with a data profile code set, also stored in a memory of the customized data integration software application creation system.

In an embodiment, a user may choose a process component it uses often when interfacing with a specific trade partner, and define the parameters of that process component by providing parameter values specific to that trading partner. If the user wishes to use this process component, tailored for use with that specific trading partner repeatedly, the user may save that tailored process component as a trading partner component, which will be associated with a trading partner code set. For example, if the user often accesses the WalmartĿ purchase orders database, the user may create a database connector process component, associated with a pre-built process component code set that may be used with any database, then tailor the database connector process component to access the specific purchase order database owned and operated by WalmartĿ by adding process component parameters associated with one or more data profile code sets. If the user uses this process component in several different integration processes, the user may wish to save this process component for later use by saving it as a trading partner component, which will be associated with a trading partner code set. In the future, if the user wishes to use this component, the user may simply select the trading partner component, rather than repeating the process of tailoring a generic database connector process component with the specific parameters defined above.

The visual elements in an embodiment may indicate that the user wishes to perform a specific process upon a set of data, that specific process correlating to one or more process component code sets, trading partner code sets, and/or data profile code sets. Each of these code sets may be a pre-defined subset of code instructions stored at the system provider server/system in an XML format. The system provider server/system in an embodiment may generate a dynamic runtime engine for executing these pre-defined subsets of code instructions correlated to each individual process-representing visual element (process component) in a given flow chart in the order in which they are modeled in the given flow chart. The customized data integration software integration application in an embodiment is the set of code instructions represented by the process reflected in the flow chart created by the user (process component code sets or trading partner code sets), along with sets of code instructions correlating to received user input (data profile code sets), and along with the dynamic runtime engine that executes these sets of code instructions.

As shown in FIG. 3, such process-representing visual elements may include, but may not be limited to a start element 302, a branch element 304, a data process element 306, a process call element 308, a connector element 310, a set properties element 312, a map element 314, and a stop element 316. Although each of these process-representing visual elements may correspond to a process component code set, they may not be configured for use with any particular enterprise or trading partner until further data attributes unique to the specific integration process are provided by the user in the form of user input associated with one or more integration process data profile code sets. Once the service provider server/system has received the user-generated flow diagram of the integration process and any necessary further user input in the form of data attributes unique to the specific integration process, the service provider server/system may generate a dynamic runtime engine, which is an executable software application capable of running on a computer within the enterprise's network available to the user of the website for download and installation within the enterprise network or at a third party server located remotely from both the service provider server/system and the enterprise network. When initiated, the dynamic runtime engine may connect to the service provider system/server, automatically download the XML or other format (e.g., JSON) process component code sets, trading partner code sets, and/or data profile code set(s), and execute them according to the flowchart generated by the user to model the requested integration process.

In an embodiment, a start element 302 may operate to begin a process flow, and a stop element 316 may operate to end a process flow. As discussed above, each visual element may require user input in order for a particular enterprise or trading partner to use the resulting process. The start element 302 in an embodiment may further allow or require the user to provide data attributes unique to the user's specific integration process, including, but not limited to the source of incoming data to be integrated.

In an embodiment, a branch element 304 may operate to allow simultaneous processes to occur within a single dynamic runtime engine installation program. The branch element 304 in an embodiment may further allow or require the user to provide data attributes unique to the user's specific integration process, including, but not limited to the number of processes the user wishes to run simultaneously within a single dynamic runtime engine installation program.

In an embodiment, a data process element 306 may operate to manipulate document data within a process. The data process element 306 in an embodiment may further allow or require the user to provide data attributes unique to the user's specific integration process, including, but not limited to searching and replacing text, choosing to zip or unzip data, choosing to combine documents, choosing to split documents, or choosing to encode or decode data. For example, in an embodiment, a data process element may require the user to provide data attributes unique to the user's specific integration process, such as choosing a specific encryption type.

In an embodiment, a process element 308 may operate to execute another process from within a process (i.e. execute a subprocess). The process element 308 in an embodiment may further allow or require the user to provide data attributes unique to the user's specific integration process, including, but not limited to the name of the process the user wishes to become a subprocess of the process within the flow diagram.

In an embodiment, a connector element 310 may operate to enable communication with various applications or data sources between which the user wishes to exchange data. The connector element 310 in an embodiment may further allow or require the user to provide data attributes unique to the user's specific integration process, including, but not limited to the source of the data, and the operation the user wishes to perform on the data. For example, in an embodiment, the source of the data may be Salesforce.com, and the operation may include getting, sending, creating, deleting, updating, querying, filtering, or sorting of the data associated with a specific Salesforce.com account. For example, a connector element in an embodiment may require the user to provide data attributes unique to the user's specific integration process, such as choosing the name for the outbound file or a location (e.g., server or address) from which an inbound file will be retrieved. As another example, a connector element may require passwords or other identification of an entity seeking access to the location of the inbound file. If proper location and permissions for that location are not provided in embodiments, the customized integration process may fail to fully execute.

In an embodiment, a set properties element 312 may operate to set values for various document and process properties. The set properties element 312 in an embodiment may further allow or require the user to provide data attributes unique to the user's specific integration process, including, but not limited to a filename, or an email subject for the data being processed.

In an embodiment, a map element 314 may operate to transform data from one format to another or from one profile to another. The map element 314 in an embodiment may further allow or require the user to provide data attributes unique to the user's specific integration process, including, but not limited to the format to which the user wishes to transform the data.

The visual elements shown in FIG. 3 represent only a few examples of visual elements representing data integration processes, and it is contemplated the visual user interface may use other visual elements representing any type of data integration process that could be performed.

Figure 4:
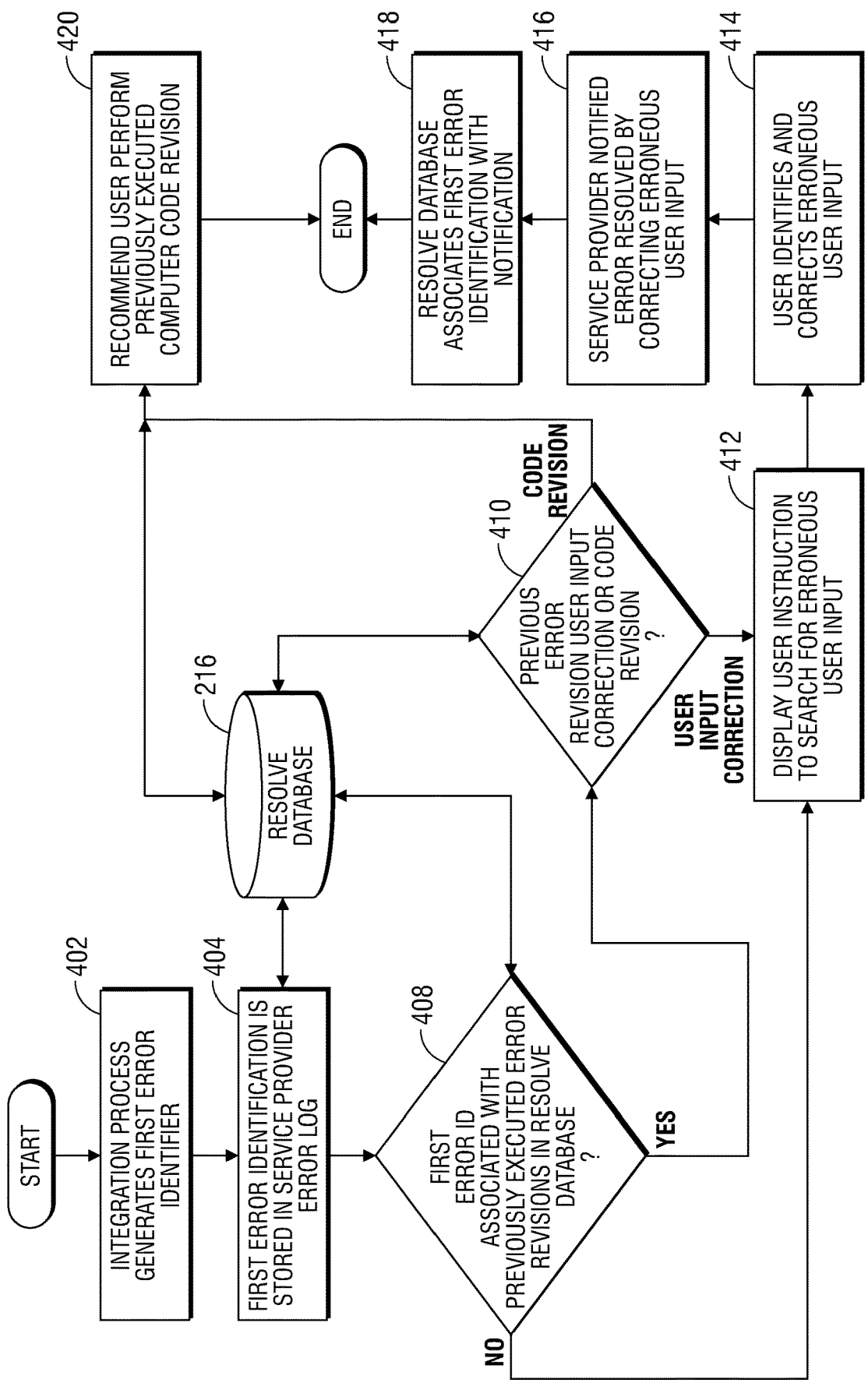
FIG. 4 is a flow diagram illustrating a process of recommending a correction of user input errors according to an embodiment of the present disclosure.

FIG. 4 is a flow diagram illustrating a process of recommending a correction of user input errors, rather than revision of process component or data profile code sets according to an embodiment of the present disclosure. As described herein, problems in the integration process could potentially occur based on errors in the code instructions executing the integration process, or on erroneous information that has been input into the integration process and upon which the code instructions operate. In the first situation, the problem may lie in the process component code sets or data profile code sets associated with the process-representing connector elements of the user-generated visual flow diagram stored at the service provider. The solution to such erroneous code sets may involve computer code revisions in an embodiment. Debugging such code sets may involve a lengthy, time-consuming process.

In the second situation, the problem may lie in the information supplied by the user at the enterprise system/network such as, for example, beginning or end point storage locations of the data to be integrated (e.g., trading partners or the business process system of the enterprise system network), incorrect permission identifications, or hardware problems occurring at the beginning or end point storage locations (as indicated on server logs at those locations). The solution to such erroneous user input may involve correction of erroneous user input in an embodiment, rather than computer code revisions. Correcting such user input errors, or determining that debugging the code sets is unlikely to resolve the problem (e.g., a hardware malfunction is causing the error) may deter the user from entering into an unnecessary and time-consuming code revision. The error revision suggestion system in an embodiment may differentiate between situations in which computer code revisions may be appropriate and situations in which correction of erroneous user input may be appropriate based on the error code or error identifier received upon attempting execution of the integration process.

At block 402, the customized data integration software application creation system in an embodiment may generate a first error identifier. This may occur in an embodiment in which the user attempts to execute the integration process modeled by the user-generated visual flow model stored at the service provider. For example, in an embodiment described with reference to FIG. 2, a user at the enterprise system/network 214 may generate the visual flow model (e.g., as depicted in FIG. 3), which may be stored at the service provider system/server 212. Upon completion of the visual flow model in such an embodiment, the service provider system/server 212 may transmit the code sets associated with each of the visual elements within the visual flow model, and a runtime engine capable of executing those code sets to the enterprise system/network 214. The user at the enterprise system/network 214 may then initiate the runtime engine to execute those code sets.

If the integration process fails to complete, the runtime engine may generate and display to the user at the enterprise system/network 214 an error indicator that may identify the type of error encountered. Example error identifiers in an embodiment may include "no data produced from map," indicating the integration process executed each of the code sets associated with the visual flow chart, but no data integration resulted from that execution. Another example error identifier in an embodiment may include "error message received from http server, code 400: bad request," indicating the runtime engine failed to make a successful communication connection to a remote server. Still another example error identifier in an embodiment may include "unparseable date" indicating one of the endpoints of the integration process at which data to be integrated may be stored does not recognize the date used to identify data stored thereon. Yet another example error identifier in an embodiment may include "error executing login," indicating the code sets or data profiles executed by the runtime engine contain erroneous user authorizations.

The error revision suggestion system in an embodiment may store the first error identifier in the service provider error log at block 404. For example, the runtime engine executing at the enterprise system/network 214 in an embodiment may transmit the error identifier generated and displayed to the user at block 402 to the resolve database 216 located at the service provider system/server 212. If the same error has occurred on multiple occasions, the resolve database 216 may also store a counter indicating the number of times the identified error has occurred.

At block 408, the error revision suggestion system in an embodiment may determine whether the first error identifier is associated with a previously executed error revision in the resolve database. For example, if the identified integration process has produced the same error on multiple occasions, the counter associated with the error identifier within the resolve database 216 may have a value greater than one, indicating the identified error has occurred during an attempted execution of one or more integration processes prior to generation of the first error identifier at block 402.

The resolve database 216 in such an embodiment may also associate the first error identifier with a revision that has been previously executed by a user to remedy the same error identified at block 402 during a prior failed integration process. Such a prior failed integration process may be the same integration process that generated the error at block 402, another integration process executed by the same user, or another integration process executed by another user. For example, the resolve database 216 in an embodiment may associate the error identifier "no data produced from map" with a previously executed revision involving correcting erroneous user input, such as, incorrect integration endpoint locations. As another example, the resolve database 216 in an embodiment may associate the error identifier "error message received from http server, code 400: bad request," indicating the runtime engine failed to make a successful communication connection to a remote server with a previously executed revision made to the computer code instructions of the integration process (e.g., connector code sets, or data profile code sets), such as correcting an erroneous http server address input into a data profile code set.

In some embodiments, the resolve database 216 may not include a counter value, but may still associate the first error identifier with a previously attempted revision. In another aspect of an embodiment, the resolve database 216 may not associate the error identifier with such a previously attempted revision if the identified error has not previously occurred. The method may proceed to block 410 if the first error identifier is associated with a previously executed error revision in the resolve database. If the first error identifier is not associated with a previously executed error revision in the resolve database, the method may proceed to block 412.

The error revision suggestion system in an embodiment in which the first error identifier is associated with a previously executed error revision in the resolve database may determine at block 410 whether the previously executed error revision included a user input correction or a computer code revision. As described herein, problems in the integration process could potentially occur due to errors in the process component code instructions or data profile code sets executing the integration process, or on erroneous information that has been input into the integration process and upon which the code instructions operate. In an embodiment in which errors in the computer code instructions have caused the problems in the integration process, a computer code revision may be an appropriate solution. In contrast, in an embodiment in which erroneous user input has caused the problems in the integration process, correction of the erroneous user input may be an appropriate solution. Debugging the process component code sets or data profile code sets may be time-consuming. As such, if the error can be resolved without debugging the process component code sets or data profile code sets, avoiding that task may save the user time. If the previously executed error revision involved correction of erroneous user input, the method may proceed to block 412. If the previously executed error revisions involved revision of computer code instructions (e.g. process component code sets or data profile code sets stored at the service provider), the method may proceed to block 420.

At block 412, in an embodiment in which the first error identifier is associated in the resolve database with a previously executed correction of erroneous user input, the error revision suggestion system may display a user instruction to search for erroneous user input into the integration process. For example, in an embodiment in which the resolve database 216 associates the first error identifier "no data produced from map" with a previously executed correction of erroneous integration endpoint locations input by the user, the error revision suggestion system may prompt the user to search for erroneous user input in an embodiment. In another aspect of an embodiment, the error revision suggestion system may provide a more specific prompt for the user to search for erroneous integration endpoint locations.

As another example, the resolve database may associate the first error identifier indicating "error executing login" with a previously executed correction of an erroneous password or username input by the user. In such an embodiment, the previously executed correction of the password or username may have involved correcting the username or password stored at the integration endpoint to match the password or username erroneously supplied by the user within the data profile code set. Correcting the username or password stored at the integration endpoint, rather than the username or password entered within the data profile code set in an embodiment may be more efficient. Once a data profile code set is revised or edited in an embodiment, the service provider system/server in an embodiment may repackage each of the connector code sets and data profile code sets, and generate a new run time engine to execute them. Thus, it may simpler for the user to merely edit the username and password stored at the integration endpoint, than to recompile and regenerate each of these code sets and runtime engines.

In some embodiments, the resolve database may associate the first error identifier with multiple previously executed error revisions that were not performed on the integration process stored at the service provider. In such an embodiment, each previously executed error revision may be associated with a confidence factor indicating the likelihood that method may resolve the associated error. The confidence score associated with each previously executed error revision in such an embodiment may be determined by the error revision suggestion system based on the frequency with which each previously executed error revision successfully resolved that error.

The error revision suggestion system in an embodiment may also display such a user instruction to search for erroneous user input where the resolve database does not associate the first error identifier with a previously executed error revision. For example, in an embodiment in which the error revision suggestion system determined at block 408 that the first error identifier is not associated with any previously executed error revision within the resolve database 216, the error revision suggestion system may point the user to search for erroneous user input, prior to attempting any time-consuming debugging efforts.

At block 414, the user may identify and resolve the identified error by correcting the erroneous user input in an embodiment. For example, an example "error executing login" may be identified during a failed attempt at integrating data from a first trading partner 208 to the enterprise system/network 214 if the username and password supplied within a data profile stored at the service provider system/server 212 does not match the credentials associated with that user at the first trading partner 208. The user may remedy this problem by changing the credentials stored at the first trading partner 208 to match the credentials stored at the service provider system/server 212 in such an embodiment. As another example, an example "no data produced from map" error may be identified during a failed attempt at integrating data from a business process system 204 to a second trading partner 210 if the data stored at business process system 204 does not match the description of that data provided in a data profile stored at the service provider system/server 212 (e.g., integration endpoint location or file structure does not match). The user may remedy this problem by changing the file structure or the location of the data as stored at the business process system 204 to match the description of that file structure or location given in the data profile stored at the service provider system/server 212. In both of these example embodiments, the data profile code sets and process component code sets associated with the integration process, as stored at the service provider system/server 212 may not be revised or altered in any way.

The runtime engine in an embodiment may notify the service provider that the error has been resolved by correcting erroneous user input at block 416. For example, in an embodiment in which the user remedies erroneous input into a data profile code set of an incorrect username or password for a first trading partner 208 by changing the username or password at the first trading partner 208 to match the input into the data profile code set, the runtime engine may notify the service provider that the error identified at block 402 has been remedied by correcting erroneous user input. Such a notification in an embodiment may also include a description of the method used to remedy the error. For example, the runtime engine may notify the service provider that the "error executing login" has been resolved by changing the username or password at the first trading partner 208 to match the input into the data profile code set.

The notification may be transmitted to the resolve database 216, where it may be stored and associated with the first error identifier identified at block 402. For example, in an embodiment in which the user remedies an "error executing login" first error identifier by changing the credentials stored at the first trading partner 208 to match the credentials stored at the service provider system/server 212, the runtime engine or API for the error revision suggestion system may transmit a notification to the resolve database 216 indicating the successful revision of the "error executing login" first error identifier using that method. As another example, in an embodiment in which the user remedies a "no data produced from map" first error identifier by changing the file structure or the location of the data as stored at the business process system 204 to match the description of that file structure or location given in the data profile stored at the service provider system/server 212, the runtime engine API for the error revision suggestion system may transmit a notification to the resolve database 216 indicating the successful revision of the "no data produced from map" first error identifier using that method.

At block 418, the error revision suggestion system in an embodiment may store an association between the first error identifier and the notification that the error was resolved by correcting erroneous user input in the resolve database. For example, the error revision suggestion system in an embodiment may store an association between "error executing login" with a counter indicating a number of times that error identifier has been remedied by correcting erroneous user input, resulting in successful execution of the identified integration process. In such an embodiment, upon receipt of the notification transmitted at block 416, the error revision suggestion system may increment that counter by a value of one.

As another example, the error revision suggestion system in an embodiment may store an association between a first error identifier "no data produced from map" with the method of changing the file structure or the location of the data as stored at the business process system 204 to match the description of that file structure or location given in the data profile stored at the service provider system/server 212. The method may then end. In such a way, the resolve database 216 may track successful error resolutions that did not involve revising data profile code sets or process component code sets stored at the service provider server/system 212. If the same or other users encounter the same errors relating to the same or similar integration process in the future, the error revision suggestion system may refer back to these stored associations within the resolve database 216 to recommend methods of resolving such errors without engaging in potentially unnecessary, time-consuming code revisions.

At block 420, in an embodiment in which the resolve database 216 associates the first error identifier with a previously executed error revision that involved revision to computer code instructions, the error revision suggestion system may recommend the user perform a previously executed error revision on these code sets underlying the integration process. Revision of connector code sets or data profile code sets in some embodiments may be unavoidable, as determined at block 410. For example, in an embodiment in which the resolve database 216 associates the error identifier "error message received from http server, code 400: bad request," with a revision of a data profile code set erroneously identifying an http server address, the error revision suggestion system in an embodiment may recommend the user perform a previously executed revision to one or more data profile code sets identifying http server addresses. Such a revision may be unavoidable in an embodiment in which the user executing the integration process does not have control of the endpoint server, and thus, cannot change the http server address to match the information within the data profile code set. In such an embodiment in which revisions of the data profile code sets or process component code sets stored at the service provider server/system 212 may be unavoidable, the error revision suggestion system may streamline this revision process by pointing the user to specific portions of the data profile code sets or process component code sets where revisions may be most likely to successfully solve the problem, as described in greater detail with reference to FIG. 5.

Figure 5:
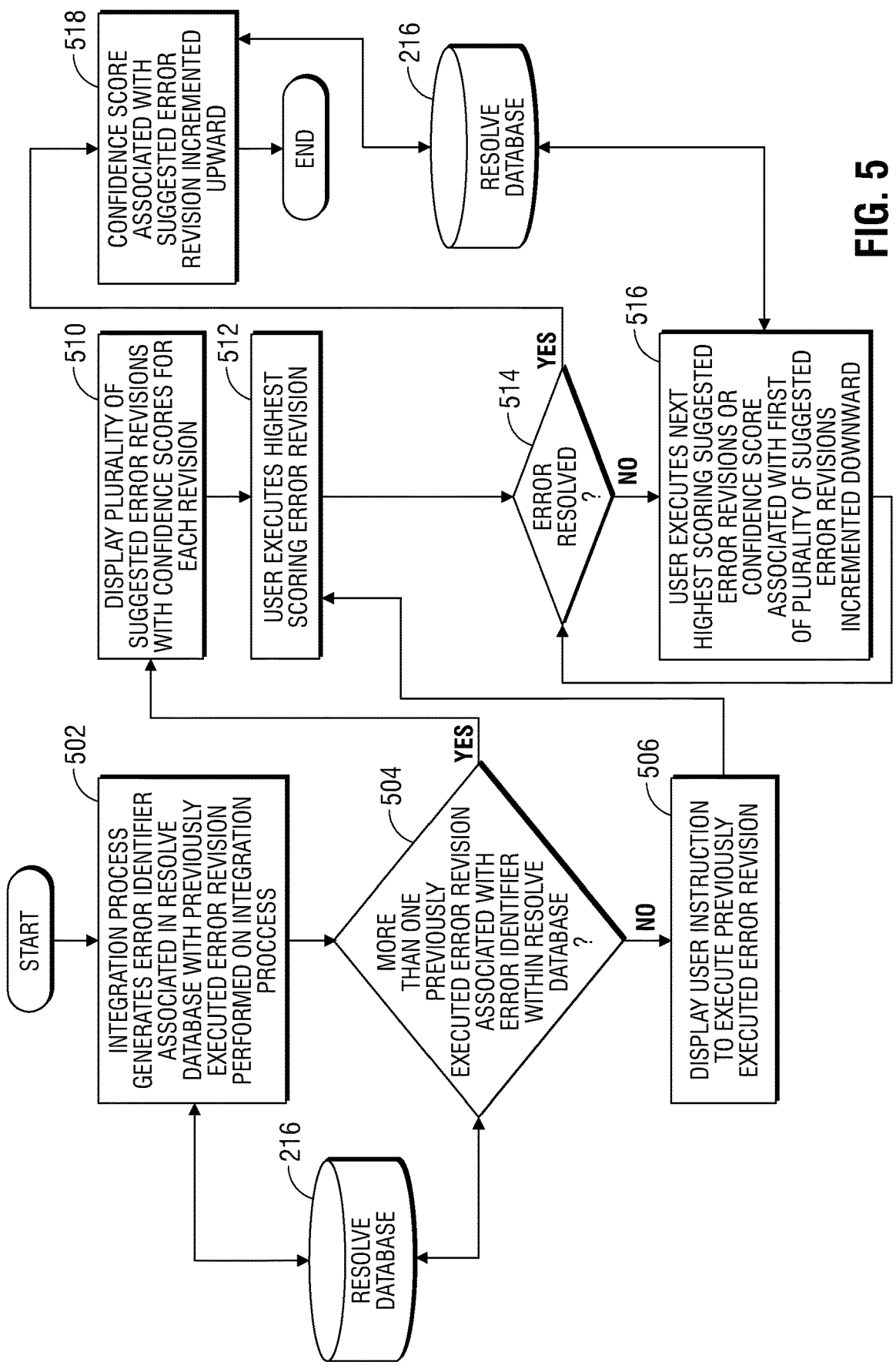
FIG. 5 is a flow diagram illustrating a process of recommending an error revision based on a confidence score associated therewith according to an embodiment of the present disclosure.

FIG. 5 is a flow diagram illustrating a process of recommending an error revision to a process component code set or a data profile code set based on a confidence score associated therewith according to an embodiment of the present disclosure. It may be determined in some embodiments that a revision to the process component code sets or data profile code sets executing the integration process may be required to resolve the error identified during a failed execution of the integration process. In such embodiments, the error revision suggestion system may suggest specific code revisions having a higher likelihood of resolving the identified error. Such a suggestion in an embodiment may be based on the code sets being executed by the integration process, and code revisions employed previously by the same or other users to resolve errors in previous attempts to execute similar code sets.

At block 502, an error identification associated in resolve database with a previously executed error revision performed on the same or similar integration process may be generated. For example, in an embodiment described with reference to FIG. 2, a runtime engine may fail to execute the integration process at the enterprise system/network 214, and may generate an error code identifier. An example error code identifier in an embodiment may be "no data produced from map," indicating the integration process executed each of the code sets associated with the visual flow chart, but no data integration resulted from that execution. Another example error identifier in an embodiment may include "error message received from http server, code 400: bad request," indicating the runtime engine failed to make a successful communication connection to a remote server. Still another example error identifier in an embodiment may include "unparseable date" indicating one of the endpoints of the integration process at which data to be integrated may be stored does not recognize the date used to identify data stored thereon. Yet another example error identifier in an embodiment may include "error executing login," indicating the process component code sets or data profile code sets executed by the runtime engine contain erroneous user authorizations.

The error code identifier generated at block 502 in an embodiment may be transmitted by the runtime engine or an API for the error revision suggestion system to the service provider server/system 212 executing the error revision suggestion system. In an embodiment, the error revision suggestion system may access the resolve database 216 and determine the error code identifier generated by the runtime engine and the integration process are associated with one or more previously executed error revisions.

The error revision suggestion system in an embodiment may determine whether more than one previously executed error revision is associated with the error identifier at block 504. As described herein, each time an error revision suggested by the error revision suggestion system in an embodiment is applied to remedy an identified error in execution of an integration process, the runtime engine or an API for the error revision suggestion system may notify the service provider that the error has been resolved. Such a notification in an embodiment may also include a description of the method used to remedy the error. The error revision suggestion system in an embodiment may store an association at the resolve database between the error identifier and the notification that the error was resolved. If the same error occurs repeatedly, the error identifier in an embodiment may be associated within the resolve database 216 with a plurality of such notifications identifying previously executed error revisions. If the error identifier is associated with a single previously executed error revision, the method may proceed to block 506. If the error identifier is associated with a plurality of previously executed error revisions, the method may proceed to block 510.

At block 506, the error revision suggestion system in an embodiment may instruct the user to execute the single previously executed error revision with which the error identifier is associated in the resolve database. As an example, the error code identifier "error message received from http server, code 400: bad request," indicating the runtime engine failed to make a successful communication connection to a remote server, may be associated with a single previously executed error revision in the resolve database 216. In such an example embodiment, the error revision suggestion system may instruct the user to execute the single revision of editing the http connection in a data profile of a connector element of the visual flow chart with which the error code identifier "error message received from http server, code 400: bad request" and the integration process modeled by the visual flow chart are associated within the resolve database 216. The suggested revision may also require the user to update the request WL, save the connection operation and process, and re-deploy the process for execution by the runtime engine. The method may then proceed to block 514.

At block 510, in an embodiment in which the error identifier is associated with a plurality of previously executed error revisions, the error revision suggestion system may display a plurality of suggested error revisions, along with confidence scores associated with each revision. As described herein in some embodiments, each previously executed error revision may be associated with a confidence factor indicating the likelihood that method may resolve the associated error. The confidence score associated with each previously executed error revision in such an embodiment may be determined by the error revision suggestion system based on the frequency with which each previously executed error revision successfully resolved that error in the past.

For example, the error code identifier "no data produced from map," indicating no data integration resulted from execution of the integration process, may be associated with a plurality of previously executed error revision in the resolve database 216. A first previously executed revision may require the user to edit a data profile within the failed map element in the visual flow chart with which the error code identifier "no data produced from map" and the integration process modeled by the visual flow chart are associated within the resolve database 216. This first previously executed revision may further require the user to edit, add, or delete necessary information based on the document data, save the profile, map and process, and re-deploy the process for execution by the runtime engine. A second previously executed revision may require the user to edit the map element within the visual flow chart (rather than the data profile associated therewith), select the correct data profile to match the data being sent to the map element, save the map and process, and re-deploy the process for execution by the runtime engine. The first previously executed revision may be associated with a highest confidence score in comparison to the confidence score associated with the second previously executed revision for the "no data produced from map" error identifier.

As another example, the error code identifier "unparseable date," indicating one of the endpoints of the integration process at which data to be integrated may be stored does not recognize the date used to identify data stored thereon, may be associated with a plurality of previously executed error revisions in the resolve database 216. In such an example embodiment, a first previously executed revision may require the user to edit the format of the date entered in a data profile associated with a failed map element of the visual flow chart with which the error code identifier "unparseable date" and the integration process modeled by the visual flow chart are associated within the resolve database 216. This first previously executed revision may further require the user to identify fields set with the date format, compare the date formats to the data being passed to the map element, update the date format to match the value coming in from the map element, save the profile, map, and process, and re-deploy the process for execution by the runtime engine. A second previously executed revision may require the user to edit the process element (rather than the data profile associated with the failed map element), add a cleanse shape prior to the failed map element, ensure all date format fields have the same format, route mismatched date formats to a notify step, and matched date formats to the map element, save the process, and re-deploy the process for execution by the runtime engine. The first previously executed revision may be associated with a highest confidence score in comparison to the confidence score associated with the second previously executed revision for the "unparseable data" error identifier.

As yet another example, the error code identifier "error executing login," indicating the code sets or data profiles executed by the runtime engine contain erroneous user authorizations, may be associated with a plurality of previously executed error revisions in the resolve database 216. In such an example embodiment, a first previously executed error revision may require the user to edit the password or username field of a data profile associated with a connector element of the visual flow chart with which the error code identifier "error executing login" and the integration process modeled by the visual flow chart are associated within the resolve database 216. This first previously executed revision may further require the user to update the password field, save the connection and the process, and re-deploy the process for execution by the runtime engine. A second previously executed revision may require the user to edit the SalesForce.comĿ (SFDC) connection, update the user and password field, save the connection and process, and re-deploy the process for execution by the runtime engine. The first previously executed revision may be associated with a highest confidence score in comparison to the confidence score associated with the second previously executed revision for the "error executing login" error identifier.

In some embodiments, the error revision suggestion system may automatically instruct the user to attempt the previously executed error revision associated with the highest confidence score. In other embodiments, the error revision suggestion system may list each of the previously executed error revisions, along with their associated confidence scores, and allow the user to choose which of the previously executed error revisions to attempt in order to resolve the current error. In some embodiments, the confidence score displayed may have a number or percentage value (e.g., 72% success rate). In other embodiments, the confidence score displayed may be a color-coded icon, or a generalized confidence rating indicating general ranges of confidence. For example, confidence scores between 0% and 33% may be represented by a red icon, or a "low" indicating a relatively small or unproven success rate, confidence scores between 34% and 66% may be represented by a yellow icon, or a "medium" indicating a relatively average success rate, and confidence scores between 67% and 100% may be represented by a green icon, or a "high" indicating a relatively high success rate.

At block 512, the user may execute the highest scoring previously executed error revision. In an embodiment in which the error revision suggestion system automatically instructs the user to attempt the previously executed error revision associated with the highest confidence score, the user may follow the automatically generated instructions from the error revision suggestion system. For example, the error revision suggestion system in such an embodiment may automatically instruct the user to attempt a first previously executed error revision requiring the user to edit a data profile within the failed map element, edit, add, or delete necessary information based on the document data, save the profile, map, and process, and re-deploy the process for execution by the runtime engine when the user encounters an error identifier "no data produced from map." As another example, the error revision suggestion system in such an embodiment may automatically instruct the user to attempt a first previously executed error revision requiring the user to edit the format of the date entered in a data profile associated with a failed map element, identify fields set with the date format, compare the date formats to the data being passed to the map element, update the date format to match the value coming in from the map element, save the profile, map, and process, and re-deploy the process for execution by the runtime engine when the user encounter an error identifier "unparseable date." In both of these example embodiments, the user may perform the automatically provided first previously executed error revision associated with a highest confidence score.

In another embodiment in which the error revision suggestion system may list each of the previously executed error revisions, along with their associated confidence scores, the user may choose one of the previously executed error revisions to attempt in order to resolve the current error. For example, in an embodiment in which the error code identifier "error executing login," is associated with a first and second previously executed error revision in the resolve database 216, the error revision suggestion system may list the first executed error revision with a confidence score of 72%, or with a green icon, and may list the second executed error revision with a confidence score of 47%, or with a yellow icon. The user in such an embodiment may choose the second executed error revision, requiring the user to edit the SFDC connection, update the user and password field, save the connection and process, and re-deploy the process for execution by the runtime engine.

The error revision suggestion system in an embodiment may determine at block 514 whether the error identified at block 502 has been resolved. The error revision suggestion system in an embodiment may receive a notification from the runtime engine or an API for the error revision suggestion system indicating whether the following execution of the integration process is successful. As an example, in an embodiment in which the error identified at block 502 is associated with a single previously executed error revision at block 504, and the error revision suggestion system instructs the user to execute that single previously executed error revision, the error revision suggestion system may determine whether that single previously executed error revision successfully resolved the error identified at block 502. As another example, in an embodiment in which the error identified at block 502 is associated with a plurality of previously executed error revisions at block 504, and the error revision suggestion system automatically instructs the user to execute the previously executed error revision associated with the highest confidence score in the resolve database 216, the error revision suggestion system may determine whether the highest-rated previously executed error revision successfully resolved the error identified at block 502. As yet another example, in an embodiment in which the error identified at block 502 is associated with a plurality of previously executed error revisions at block 504, and the error revision suggestion system allows the user to choose between them, the error revision suggestion system may determine whether the user-selected previously executed error revision successfully resolved the error identified at block 502. If the suggested previously executed error revision successfully resolved the error, the method may proceed to block 518. If the suggested previously executed error revision successfully did not resolve the error, the method may proceed to block 516.

At block 516, the error revision suggestion system in an embodiment may execute a next highest scoring suggested error revision and adjust a confidence score associated with the previously executed error revision determined to have failed to resolve the error at block 514. For example, the error revision suggestion system in an embodiment may determine the first highest ranked previously executed error revision failed to resolve the error with the identifier "no data produced from map." In such an embodiment, the error revision suggestion system may decrease the confidence score associated with the first highest ranked previously executed error revision and the error identifier "no data produced from map" within the resolve database 216 to reflect the failure identified at block 514. Further, the error revision suggestion system in such an embodiment may instruct the user at block 516 to execute the steps of the second highest ranked previously executed error revision, including editing the map element within the visual flow chart (rather than the data profile associated therewith), selecting the correct data profile to match the data being sent to the map element, saving the map and process, and re-deploying the process for execution by the runtime engine.

In another example, the error revision suggestion system in another embodiment may determine the first highest ranked previously executed error revision failed to resolve the error with the identifier "unparseable date." In such an embodiment, the error revision suggestion system may decrease the confidence score associated with the first highest ranked previously executed error revision and the error identifier "unparseable date" within the resolve database 216 to reflect the failure identified at block 514. Further, the error revision suggestion system in such an embodiment may instruct the user at block 516 to execute the steps of the second highest ranked previously executed error revision, including editing the process element, adding a cleanse visual element operating to validate document field values upon which the failed map element may operate, prior to the failed map element, ensuring all date format fields have the same format, routing mismatched date formats to a notify step and matched date formats to the map element, saving the process, and re-deploying the process for execution by the runtime engine.

The method may then return to block 514 to determine whether the next highest scoring previously executed error revision suggested at block 516 successfully resolved the error. The loop between blocks 514 and 516 may continue until the error revision suggestion system in an embodiment suggests an error revision that successfully resolves the error identified at block 502. The method may then proceed to block 518.

At block 518, in an embodiment in which the suggested previously executed error revision successfully resolved the error identified at block 502, the error revision suggestion system may increase the confidence score associated with the suggested previously executed error revision within the resolve database 216. For example, in an embodiment in which an error identifier "error executing login" is associated with a plurality of previously executed error revisions, and the user chooses to execute the second executed error revision, the steps of editing the SFDC connection, updating the user and password field, saving the connection and process, re-deploying the process for execution, and executing the process may have successfully resolved the login error. In such an embodiment, the error revision suggestion system may increase the confidence score associated with the second highest ranked previously executed error revision associated with the "error executing login" error identifier. By increasing the confidence factor of the second highest ranked previously executed error revision in such an embodiment, the error revision suggestion system may cause this revision to become the first highest ranked previously executed error revision in later iterations of the method described with reference to FIG. 5. If the confidence score is given a percentage value, the error revision suggestion system may increase both the numerator and denominator of the confidence score in such an embodiment.

In another example embodiment in which an error identifier "error message received from http server, code 400: bad request" is associated with a single previously executed error revision, the steps of editing the http connection in a data profile of a connector element, updating the request XML, saving the connection operation and process, re-deploying the process and executing the re-deployed process may have successfully resolved the identified problem. In such an embodiment, the error revision suggestion system may increase the confidence score associated with this single previously executed error revision associated with the error identifier "error message received from http server, code 400: bad request." If the error identifier "error message received from http server, code 400: bad request" is not yet associated with a confidence factor, the error revision suggestion system in an embodiment may establish an association between the error identifier "error message received from http server, code 400: bad request" and a confidence factor of 100% in the resolve database 216 at block 518. In such a way, the error revision suggestion system may track success rates of potential error resolutions over a plurality of users and integration processes in order to more efficiently guide the user through the error resolution process. Once the identified error has been resolved, and confidence factors associated with revision causing the resolution of the error have been updated, the method may then end.

The blocks of the flow diagrams (FIGS. 4-5) discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an error revision suggestion system comprising:
   a processor configured to receive inputs, via a graphical user interface, selection of a plurality of visual modeling elements selected from a menu of visual modeling elements representing customized code sets to generate a visual model of an end-to-end business integration process with a plurality of customized software integration applications;

a memory configured to store the plurality of customized software integration applications for specific integration processes for transforming data to enable electronic data exchange between user business process systems and trading partners;

a processor configured to transmit an executable run-time engine for a first of the plurality of customized software integration applications and a first customized code set for execution by a user at a specific user business process system for conducting the end-to-end business integration process;

the processor configured to receive an indication of an error, as an error code, during execution of a portion of the end-to-end business integration process represented by the code sets associated with the visual model has occurred during execution of the first customized code set; and the processor configured to transmit an instruction to the specific user business process system indicating a correction of erroneous user input into the portion of the end-to-end business integration process associated with the visual model is required to resolve the error if the error is associated in a resolve database with a previously executed correction of erroneous user input.

2. The information handling system operating the error revision suggestion system of claim 1 further comprising:
the processor configured to receive an indication the error has been resolved by correcting erroneous user input; and
the resolve database configured to store an association between the error and the received indication.

3. The information handling system operating the error revision suggestion system of claim 1 further comprising:
the processor configured to determine the error is associated in the resolve database with a previously executed code set revision; and
the processor configured to generate an instruction to the user to perform the previously executed code set revision on the first customized code set.

4. The information handling system operating the error revision suggestion system of claim 3 further comprising:
the processor configured to receive an indication the error has been resolved by performing the previously executed code set revision on the first customized code set; and
the processor configured to increment a confidence score tally stored in the resolve database and associated with the previously executed code set revision and the error in the resolve database.

5. The information handling system operating the error revision suggestion system of claim 1 further comprising:
the processor configured to determine the error is associated in the resolve database with a plurality of previously executed code set revisions; and
the processor configured to instruct the user to perform a first of the plurality of previously executed code set revisions associated in the resolve database with a highest confidence score on the first customized code set.

6. The information handling system operating the error revision suggestion system of claim 5 further comprising:
the processor configured to receive an indication the error has not been resolved by performing the first of the plurality of previously executed code set revisions on the first customized code set;
the processor configured to instruct the user to perform a second of the plurality of previously executed code set revisions associated in the resolve database with a second highest confidence score on the first customized code set; and
the processor configured to decrement the highest confidence score associated in the resolve database with the first of the plurality of previously executed code set revisions.

7. The information handling system operating the error revision suggestion system of claim 1 further comprising:
the processor configured to determine the error is not associated in the memory with a previously executed correction of erroneous user input or a previously executed code set revision; and
the processor configured to transmit an indication to the user to search for erroneous user input to the integration process.

8. An error revision suggestion method for customized software integration applications comprising:
receiving inputs, via a processor executing a graphical user interface, for selection of a plurality of visual modeling elements selected from a menu of visual modeling elements representing customized code sets to generate a visual model of an end-to-end business integration process with a plurality of customized software integration applications;

storing in a memory the plurality of customized software integration applications for specific integration processes for transforming data to enable electronic data exchange between user business process systems and trading partners;

transmitting an executable run-time engine for a first of the plurality of customized software integration applications and a first customized code set for execution by a user at a specific user business process system for conducting the end-to-end business integration process;

receiving, via the processor, an indication an error, as an error code, during execution of a portion of the end-to-end business integration process represented by the code sets associated with the visual model has occurred during execution of the first customized code set; and transmitting, via the processor, an instruction to the user indicating a correction of an identified erroneous user input into the portion of the end-to-end business integration process associated with the visual model is required to resolve the error if the error is associated in a resolve database with a previously executed correction of erroneous user input.

9. The method of claim 8 further comprising:
receiving, via the processor, an indication the error has been resolved by correcting erroneous user input; and
storing an association between the error and the received indication in the resolve database.

10. The method of claim 8 further comprising:
determining, via the processor, the error is associated in the resolve database with a previously executed code set revision;
instructing the user, via the processor, to perform the previously executed code set revision on the first customized code set.

11. The method of claim 10 further comprising:
receiving an indication the error has been resolved by performing the previously executed code set revision on the first customized code set; and incrementing a confidence score associated with the previously executed code set revision and the error in the resolve database.

12. The method of claim 8 further comprising:
determining, via the processor, the error is associated in the memory with a plurality of previously executed code set revisions;
transmitting an instruction to the user, via the processor, to perform a first of the plurality of previously executed code set revisions associated in the resolve database with a highest confidence score on the first customized code set.

13. The method of claim 12 further comprising:
receiving an indication, via the processor, that the error has not been resolved by performing the first of the plurality of previously executed code set revisions on the first customized code set;
instructing the user, via the processor, to perform a second of the plurality of previously executed code set revisions associated in the resolve database with a second highest confidence score on the first customized code sets; and
decrementing the highest confidence score associated with the first of the plurality of previously executed code set revisions via the processor.

14. The method of claim 8 further comprising:
determining, via the processor, the error is not associated in the memory with a previously executed correction of erroneous user input or a previously executed code set revision; and
transmitting an indication, via the processor to the user to search for erroneous user input to the integration process.

15. An information handling system operating an error revision suggestion system comprising:
a processor configured to receive inputs, via a graphical user interface, of a selection of a plurality of visual modeling elements selected from a menu of visual modeling elements representing customized code sets to generate a visual model of an end-to-end business integration process with a plurality of customized software integration applications;
a memory for configured to store the plurality of customized software integration applications for specific integration processes for transforming data to enable electronic data exchange between user business process systems and trading partners;
a processor configured to transmit an executable run-time engine for a first of the plurality of customized software integration applications and a first customized code set for execution by a user at a specific user business process system for conducting the end-to-end business integration process;
the processor configured to receive an indication an error, as an error code, during execution of a portion of the end-to-end business integration process represented by the code sets associated with the visual model has occurred during execution of the first customized code set;
the processor configured to determine the error during execution of the portion of the end-to-end business integration process is associated in a resolve database with a previously executed error resolution method, wherein the previously executed error resolution method was executed to correct a previous error in execution of another of the plurality of customized software integration applications stored in memory; and
the processor configured to transmit an indication to the user that a correction of erroneous user input into the portion of the end-to-end business integration process associated with the visual model is required to resolve the error if the error is associated in a resolve database with a previously executed correction of erroneous user input.

16. The information handling system operating the error revision suggestion system of claim 15 further comprising:
the processor configured to receive an indication the error has been resolved by correcting erroneous user input; and
the resolve database configured to store an association between the error and the received indication.

17. The information handling system operating the error revision suggestion system of claim 15 further comprising:
the processor configured to determine the error is associated in the resolve database with a previously executed code set revision; and
the processor configured to instruct the user to perform the previously executed code set revision on the first customized code set.

18. The information handling system operating the error revision suggestion system of claim 17 further comprising:
the processor configured to receive an indication the error has been resolved by performing the previously executed code set revision on the first customized code set; and
the processor configured to increment a confidence score associated with the previously executed code set revision and the error in the resolve database.

19. The information handling system operating the error revision suggestion system of claim 15 further comprising:
the processor configured to determine the error is associated in the resolve database with a plurality of previously executed code set revisions; and
the processor configured to instruct the user to perform a first of the plurality of previously executed code set revisions associated in the resolve database with a highest confidence score on the first customized code set.

20. The information handling system operating the error revision suggestion system of claim 19 further comprising:
the processor configured to receive an indication the error has not been resolved by performing the first of the plurality of previously executed code set revisions on the first customized code set;
the processor configured to instruct the user to perform a second of the plurality of previously executed code set revisions associated in the resolve database with a second highest confidence score on the first customized code set; and
the processor configured to decrement the highest confidence score associated with the first of the plurality of previously executed code set revisions.

\* \* \* \* \*